United States Patent
Harter et al.

[11] Patent Number: 6,079,321
[45] Date of Patent: Jun. 27, 2000

[54] TWO-SURFACED GRILL WITH COMPUTER CONTROLLED TWO-STAGE UPPER PLATEN POSITIONING MECHANISM

[75] Inventors: Dave Harter; Doug Jones, both of New Port Richey, Fla.; Jeffrey R. Cook, Sugarloaf, Pa.

[73] Assignee: Garland Commercial Industries, Inc., Freeland, Pa.

[21] Appl. No.: 09/338,641

[22] Filed: Jun. 23, 1999

Related U.S. Application Data

[63] Continuation of application No. 08/862,932, May 29, 1997, Pat. No. 5,934,182.
[60] Provisional application No. 60/019,330, Jun. 6, 1996.

[51] Int. Cl.$^7$ .............................. A47J 37/00; A47J 37/06
[52] U.S. Cl. .................. 99/349; 99/372; 99/379
[58] Field of Search .............................. 99/349, 353–355, 99/426, 432, 372–380, 422–425, 389, 390, 391, 394; 219/524, 525, 521, 443, 388; 425/136, 151, 160, 298, 324.1, 343, 293, 317, 394; 100/92, 315, 319, 320, 323; 426/496, 513, 523

[56] References Cited

U.S. PATENT DOCUMENTS

| | | |
|---|---|---|
| 32,994 | 7/1861 | Adamson et al. . |
| 3,880,064 | 4/1975 | Martinex ................................. 99/349 |
| 4,165,682 | 8/1979 | Weiss . |
| 4,483,239 | 11/1984 | Mueller et al. . |
| 4,510,376 | 4/1985 | Schneider . |
| 4,567,819 | 2/1986 | Adamson . |
| 4,586,428 | 5/1986 | Adamson . |
| 4,601,237 | 7/1986 | Harter et al. . |
| 4,669,373 | 6/1987 | Weimer et al. . |
| 4,697,504 | 10/1987 | Keating . |
| 4,700,619 | 10/1987 | Scanlon . |
| 4,763,571 | 8/1988 | Bergling et al. . |
| 4,878,424 | 11/1989 | Adamson . |
| 4,972,766 | 11/1990 | Anetsberger .............................. 99/332 |
| 4,987,827 | 1/1991 | Marquez . |
| 4,989,580 | 2/1991 | Dunham . |
| 5,070,775 | 12/1991 | Blake . |
| 5,197,377 | 3/1993 | Jennings et al. . |
| 5,293,028 | 3/1994 | Payne . |
| 5,341,727 | 8/1994 | Dickson . |
| 5,451,288 | 9/1995 | Smith et al. . |
| 5,473,976 | 12/1995 | Hermsnsson ............................. 99/349 |
| 5,531,155 | 7/1996 | Pellicane et al. ........................ 99/372 |
| 5,555,794 | 9/1996 | Templeton et al. ...................... 99/349 |

(List continued on next page.)

FOREIGN PATENT DOCUMENTS

| | | |
|---|---|---|
| 759 279 A1 | 2/1997 | European Pat. Off. . |
| 2575913 | 7/1986 | France . |
| 2588062 | 4/1987 | France . |
| 2638627 | 5/1990 | France . |
| 2289210 | 11/1995 | United Kingdom . |
| WO 87/03186 | 6/1987 | WIPO . |

*Primary Examiner*—Timothy Simone
*Attorney, Agent, or Firm*—Ohlandt, Greeley, Ruggiero & Perle

[57] ABSTRACT

A microprocessor controlled grill apparatus for simultaneous two-sided cooking of food items. The grill apparatus includes a stationary lower cooking platen, and an upper cooking platen which is raised and lowered by a unique linear actuator. This actuator provides for two distinct types and phases of movement. The upper platen is lowered from its uppermost, angled open position first by an arcing movement which rotates the rear edge of the upper platen about a slide or thrust bearing and arcs the front edge of the upper platen downward until the upper platen is substantially parallel to but raised, or floating, above the lower platen and uncooked food. Next, the linear actuator lowers the upper platen toward the food, while keeping the upper platen horizontal and parallel to the lower platen. The microprocessor control of this apparatus allows the gap between the upper and lower platens to be calibrated to an extremely fine degree, which may be fixed or varied for preset cooking cycles for various standardized menu items, stored and accessed automatically.

5 Claims, 5 Drawing Sheets

U.S. PATENT DOCUMENTS

| | | |
|---|---|---|
| 5,582,755 | 12/1996 | Maher, Jr. et al. . |
| 5,597,499 | 1/1997 | Dunn . |
| 5,655,434 | 8/1997 | Liebemann .......................... 100/319 X |
| 5,676,046 | 10/1997 | Taber et al. ................................ 99/340 |
| 5,755,150 | 5/1998 | Matsumoto et al. ....................... 99/372 |
| 5,771,782 | 6/1998 | Taber et al. ............................ 99/385 X |
| 5,802,958 | 9/1998 | Hermansson .......................... 99/379 X |
| 5,839,359 | 11/1998 | Gardener .................................... 99/349 |
| 5,881,634 | 3/1999 | Newton ................................. 99/379 X |
| 5,890,419 | 4/1999 | Moravec .................................... 99/349 |

TWO-SURFACED GRILL WITH COMPUTER CONTROLLED TWO-STAGE UPPER PLATEN POSITIONING MECHANISM

This application claims the benefit of U.S. Provisional Application Ser. No. 60/019,330, filed Jun. 6, 1996. This application is a continuation of U.S. patent application Ser. No. 08/862,932, filed on May 29, 1997 now U.S. Pat. No. 5,934,182. Moreover, the present invention generally relates to an automated two-sided grill used for cooking a variety of food products which have varying thicknesses and cooking requirements.

BACKGROUND OF THE INVENTION

Single surface grills are widely used in most restaurants for cooking a wide variety of food products. Many fast food restaurant menu items require cooking on both sides, and such restaurants have found it advantageous to cook both sides at the same time to expedite the cooking time. With a single surface grill it is necessary for the operator to turn, for example, hamburger patties over after they have been cooked on one side for cooking on the second side. This increases the amount of operator attention required for cooking these food products and also increases the cooking time.

Two-sided grills have been made with upper and lower cooking platens for cooking food products such as hamburger patties. Two-sided cooking grills reduce the overall cooking time and the amount of operator attention required for cooking the hamburger patties. However, there are a number of interrelated shortcomings in the two-sided cooking grills currently in use.

The upper cooking platen in two-sided grills used by commercial food service establishments are generally large enough to enable the operator to cook a number of individual hamburger patties or other items at the same time. The patties are pre-formed in several different nominal sizes and thicknesses and are commonly frozen for storage and transportation. The frozen patties are relatively rigid when initially placed on the lower cooking platen and if the upper platen rests only on the thickest patty or patties, even small differences in the thickness of the patties in the group being cooked can prevent or delay proper heat transmission from the upper platen to some of the thinner patties. This can result in uneven cooking of the patties. On the other hand, the patties typically soften and shrink or decrease in thickness as they thaw and cook. The weight of the upper cooking platen at this stage of the process can excessively compress the hamburger patties which can adversely affect the texture and appearance of the cooked patties.

Thus, two-sided grills present several special problems including: accommodating variations in initial thickness of the individual patties in the group being cooked; accommodating the decrease in thickness of the patties that occurs during cooking; preventing excessive compaction of the patties; and accommodating different groups of patties of nominally different thicknesses. In addition, in two-sided grills, there is the problem of moving the upper platen at the beginning and end of the cooking cycle. In order to facilitate timed cooking, the two-sided grill is desirably arranged to raise the upper platen at the end of a cooking cycle to stop cooking by the upper platen and enable removal of the cooked products from the lower platen.

Various two-sided grills have been made in which the upper cooking platen is mounted on a support arm for swinging movement about a horizontal axis between the lower cooking position and a raised position. On various two-sided grills the upper platen is counter-balanced with a gas spring to assist in the manual lifting of the platen at the completion of a timed cooking cycle. This greatly limits the amount of pressure that can be applied by the upper platen to the frozen patties when initially placed in the cooking position. Heat will not be quickly transmitted to the patties, and consequently, the patties will not achieve the desired amount of carmelization.

Other two-sided grills utilize an upper platen counterbalanced with heavy weights to automatically raise the platen and keep it in a raised position. These grills use electromechanical, pneumatic or hydraulic mechanisms to hold the platen in the cooking position and mechanical stops to regulate the spacing between the upper platen and the lower platen cooking surface. Some grills use multiple pins adjustably mounted throughout the cooking surface of the upper platen for engagement with the upper face of the lower platen as mechanical stops. These stop pins, however, limit the usable cooking area on the upper and lower platens and make it difficult to clean the upper platen. Grease and other debris generated by the cooking process tend to bake on the pins and impede their adjustment. Other grills use external cams mounted on shafts extending horizontally through the platen cover as mechanical stops. These are also difficult to clean and over time generate wear on the lower platen surface.

Still other arrangements include stop pins disposed inside the platen cover with the platen hanging or floating from the upper surfaces of these pins. The adjustment for the various product thickness settings is done by rotating a series of handles that protrude through the upper surface of the platen cover. Once again, the grease and other debris normally created by cooking hamburgers and other foods migrate down the handles, bake on the stop pins and impede their adjustment. In addition, the carbonized matter on the pins and hanging mechanism alters the distance between the platens, requiring regular realignment.

In each of these instances, the mechanical stops that regulate the spacing of the platens for the various products require that the stops be adjusted manually with each different product that is cooked. Even with such mechanical stops, when the food items are of even nominally different thicknesses, the upper platen will contact the thickest patty first. Only after the thickest patty has begun to shrink as it cooks will the platen contact the thinner patties. Because the mechanical stops are typically set for the finished product thickness, these stops will only be reached once the final, thinnest patties are contacted by the upper platen and cooked. Thus, such an arrangement provides very uneven cooking of the patties. This limitation can also be observed when individual patties have varying thicknesses across their surfaces. High spots will be overcooked or even burned, while portions having a lower profile will be undercooked. Individual patties, then, can have both burned and raw portions, providing an unacceptable product.

The present invention seeks to overcome these limitations by providing precise, controlled, two-sided cooking by means of an apparatus having a floating upper platen construction which allows for complete control of the degree of pressure the upper platen places on the food. The present invention also seeks to overcome these limitations by providing microprocessor control of both the upper platen operation and the entire cooking cycle. The upper platen according to the present invention is positioned substantially parallel to the patties and the lower platen prior to coming into contact with the patties. This optimizes cooked product quality and uniformity and minimizes operator involvement. The present invention also provides many additional advantages which shall become apparent as described below.

SUMMARY OF THE INVENTION

The present invention provides precise, controlled, two-sided cooking by means of an apparatus having a floating upper platen construction which allows for complete control of the degree of pressure the upper platen places on the food. This floating upper platen construction also permits the pressure to be varied through the cooking process, allowing, for example, significant pressure during the first stage of cooking to provide proper searing and carmelization, and lighter pressure as cooking progresses, preventing over-compression, burning, boiling and other undesirable effects.

It is an object of the present invention to achieve this floating construction with a positioning mechanism which controls the upper platen's movement in both an arcing, clam-shell fashion, in which the front edge of the upper platen swings from its raised, open position to a lower, closed position, and a second, vertical fashion, in which the upper platen, now parallel to the lower platen, moves vertically downward to contact the food.

It is another object of the present invention to provide an improved process for two-sided cooking. Vertical movement is also possible during the cooking cycle, allowing for adjustment of the upper platen as the food shrinks during cooking.

It is another object of this invention to provide greater consistency in the cooking process and to decrease the time the operator must spend initiating and monitoring the cooking process. This invention thus uses a programmable computing device to control the motion of a motorized upper platen positioning assembly. This allows the current invention to omit mechanically set physical stops which control the gap between cooking surfaces, and hence to avoid all the problems and limitations inherent in such constructions (e.g., labor intensive to operate, hard to clean, limited gradations available to adjust the gap between platens, increased wear on the surfaces and greater maintenance required). It provides many other advantages as well, including providing for a variety of stored data regarding optimal pressure and timing during cooking for a variety of food products and dimensions. In addition, increased automation of the cooking process decreases the possibility of operator error.

It is a further object of the invention to provide for enhanced ease of use and cleaning. The dual vertical and arcing movement also allows for the upper platen's lowest edge to be further from the lower platen when in the open position. This allows for greater access to the lower cooking platen for easier cleaning and easier loading and removal of food. In addition, this permits the device to be used in a "flat" mode for items which are not suited to two-sided cooking. In such an application, the upper platen will remain unheated in its uppermost open position, and the lower platen can be used as a conventional flat cooking surface.

It is also an object of this invention to enhance the safety of operation of two-surface cooking devices. In this device, two switches must be activated simultaneously to initiate upper platen movement and the cooking cycle, thus increasing the safety of operation and minimizing the risk that an operator could inadvertently activate the positioning mechanism and cause injury.

Other and further objects, advantages and features of the present invention will be understood by reference to the following specification in conjunction with the annexed drawings, wherein like parts have been given like numbers.

DESCRIPTION OF THE PREFERRED EMBODIMENTS

Figure 1:
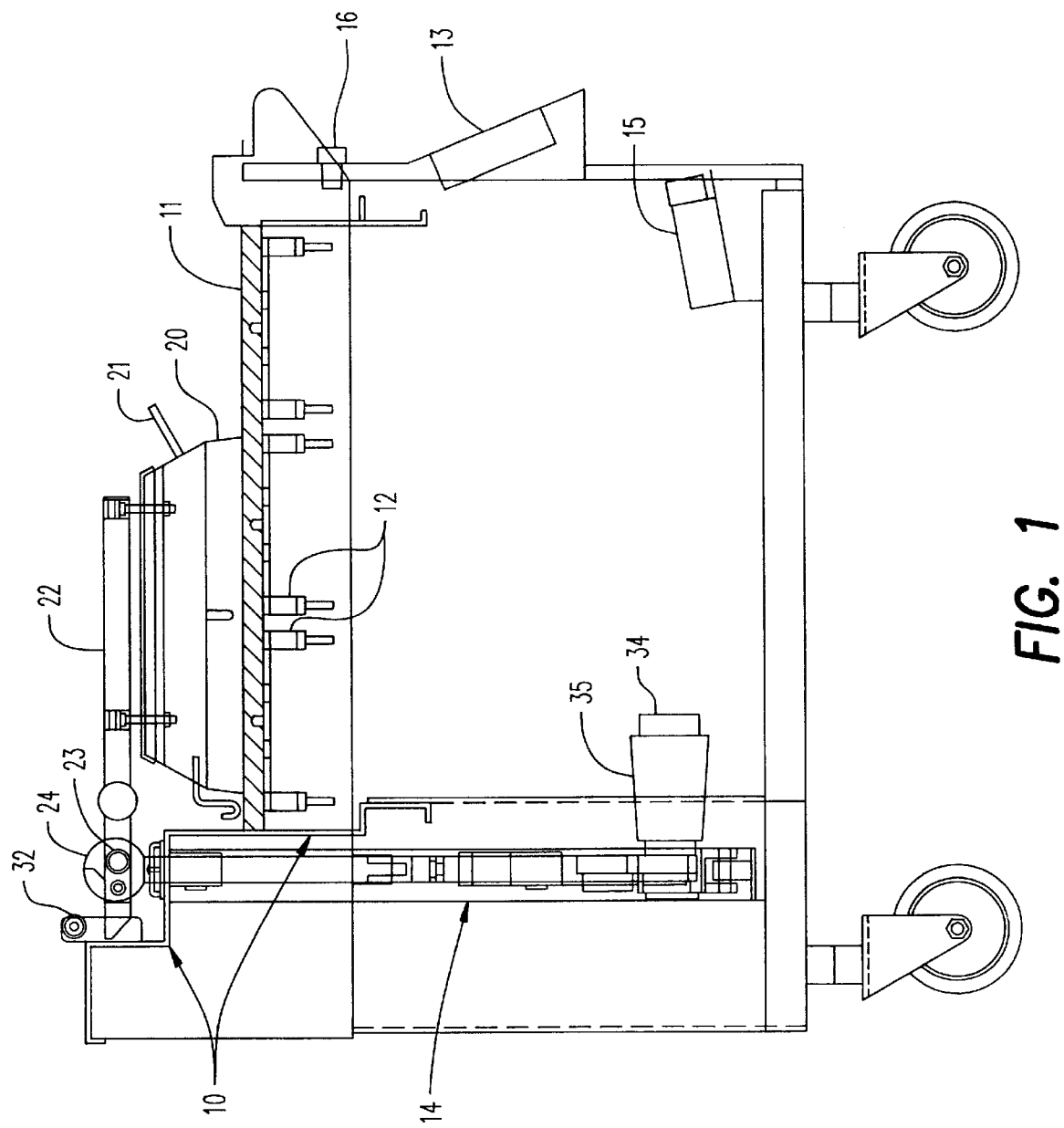
FIG. 1 is a side elevation view of the cooking apparatus embodying the present invention, shown with the upper platen in its fully lowered position.
Figure 2:
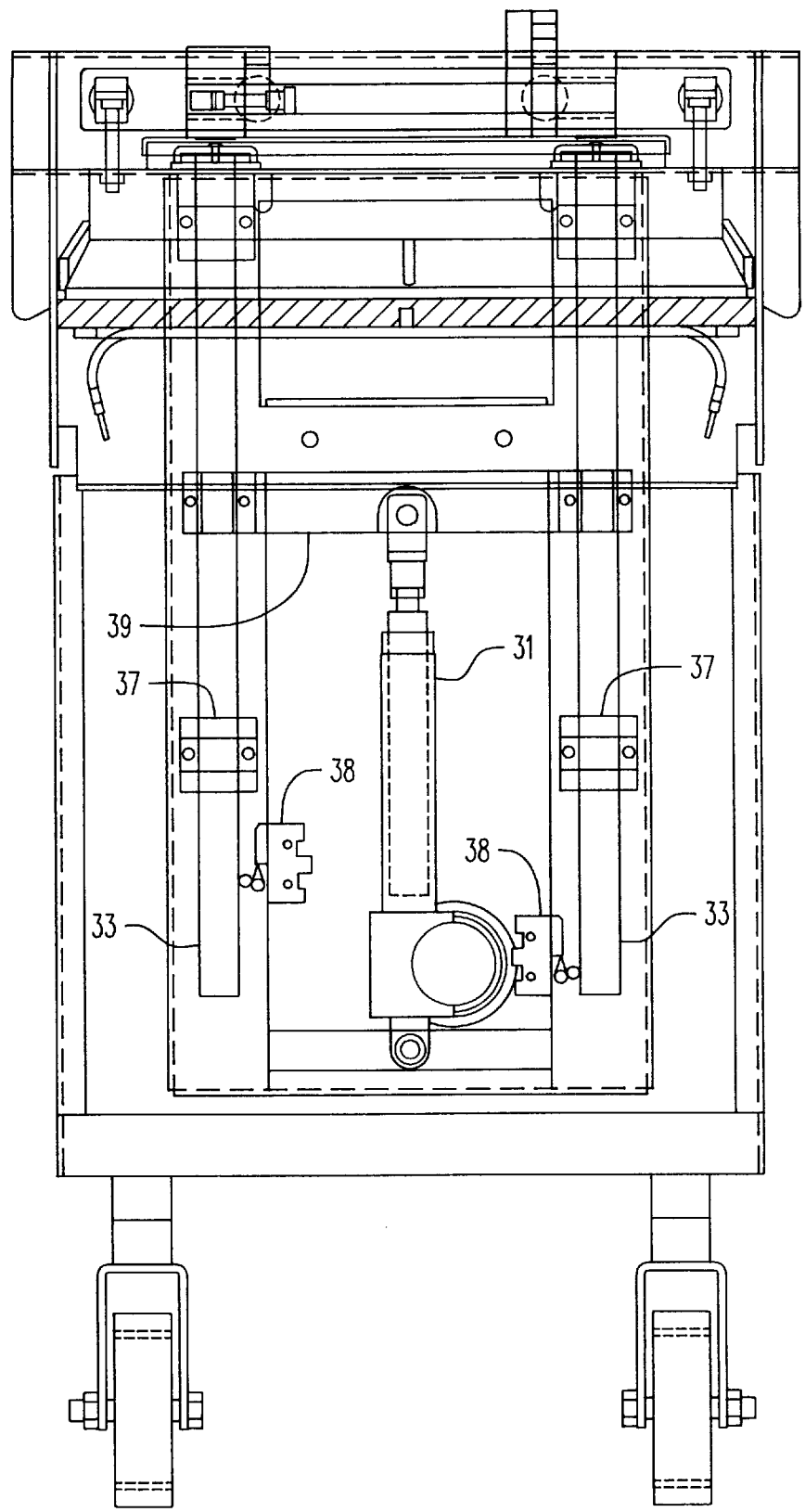
FIG. 2 is a rear schematic view of the cooking apparatus shown in FIG. 1.

The preferred configuration of the two-surfaced cooking apparatus comprises a support structure 10 to which a lower cooking platen 11 is horizontally mounted. This lower platen has a smooth level cooking surface on its upper side. This lower platen 11 is heated to cooking temperature by gas or electric means via heating elements 12 or equivalent gas burners. In this embodiment, lower platen 11 is of substantial dimension, for example two feet by three feet, to accommodate large numbers of food items at once.

An upper platen assembly is movably mounted to the rear of support structure 10 by means of a positioning mechanism. The upper platen assembly comprises an upper cooking platen 20 heated to cooking temperature by heating elements mounted within a casing. Upper cooking platen 20 is either smaller than or equivalently sized to lower cooking platen 11. Upper platen 20 has a handle 21 mounted on its front side for manual manipulation of the upper platen assembly. In a preferred embodiment, two separate upper platen assemblies are mounted over a single lower platen, allowing for greater flexibility for the cook/operator.

Figure 3:
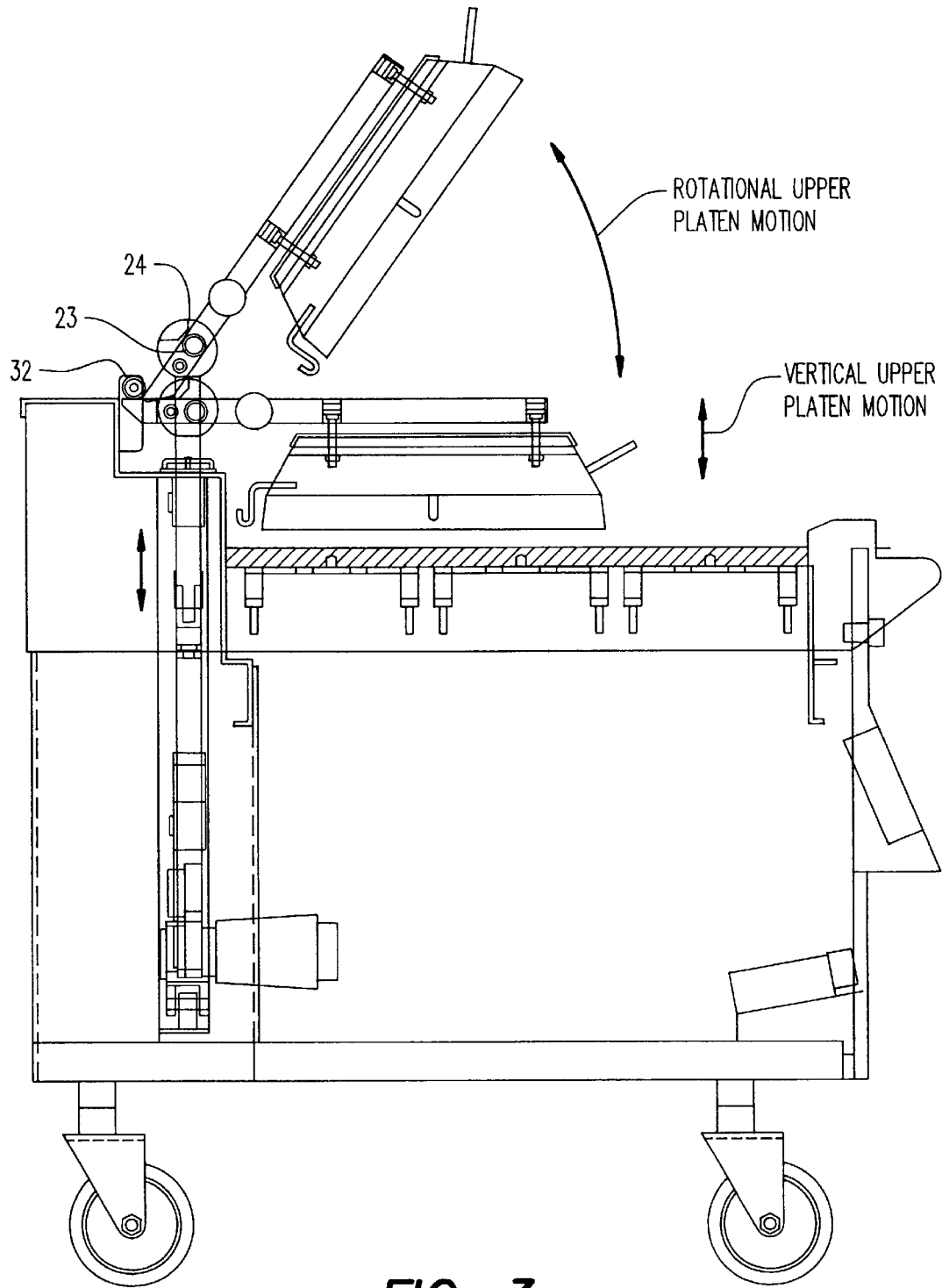
FIG. 3 is a progressive presentation of the cooking apparatus of FIG. 1 showing the motion of the upper platen.

The positioning mechanism facilitates two distinct motions by upper platen 20 from its uppermost position to a cooking position. In this embodiment, linear actuator 31 is linked to two vertical reciprocating shafts 33 by actuator cross bar linkage 39. Actuator cross bar linkage 39 is clamped to vertical reciprocating shafts 33 which run through linear motion bearings 37. These vertical shafts 33 are affixed to arm pivot/stop heads 24. Cantilever bars 22 run through arm pivot/stop heads 24 through rotational pivot bearings 23. When upper platen 20 is in its uppermost rotational position (see FIG. 3), linear actuator 31 is extended to its maximum position, vertical reciprocating shafts 33 and arm pivot/stop heads 24 are extended upward and to a position which forces the back end of cantilever bars 22 to contact rotational bearing 32 forcing rotational motion of upper platen 20 to an angle of approximately 54° from the horizontal. When linear actuator motion is reversed, upper platen 20 descends both vertically and through an arc caused by the cantilever weight of upper platen 20 maintaining contact between rotational bearing 32 and back of cantilever bars 22. When cantilever bars 22 and upper platen 20 become parallel with lower platen 11, the stop portion of arm pivot/stop head 24 stops the rotational motion of cantilever bars 22 causing purely vertical motion of upper platen 20 from this point and further down to any of the cooking positions.

The linear actuator assembly comprises a drive motor 35, a linear actuator 31, two substantially vertical reciprocating shafts 33 and position sensor switches 38. Linear actuator 31, when activated, moves upper platen 20 vertically while the cantilever weight of upper platen 20 maintains contact between arm pivot/stop head 24 until the back of cantilever bar 22 makes contact with rotational bearing 32. This movement ensures that upper platen 20 is constantly parallel to lower platen 11 during this stage of upper platen travel. Once cantilever bar 22 makes contact with rotational bearing 32 the vertical motion is changed to rotational motion to a point where upper platen 20 is raised to the point at which upper position sensor switch 39 is set (approximately 54° above horizontal). An audible signal is sounded five seconds prior to the start of upward platen movement to alert the operator of impending upper platen movement. When activation buttons 16 are depressed simultaneously to start a cooking cycle user interface controller 13 sends information to motor position controller 15. This information is used by motor position controller 15 to activate linear drive motor 35. The action of the rotational motion of linear drive motor 35 causes electrical pulses to be generated by positioning pulse encoder 34. The pulses generated by positioning pulse generator 34 are received by motor position controller 15. This information and the activation of lower position sensor switch 38 allows motor controller 15 to accurately position the entire drive system to a predetermined upper platen position for cooking.

Figure 4B:
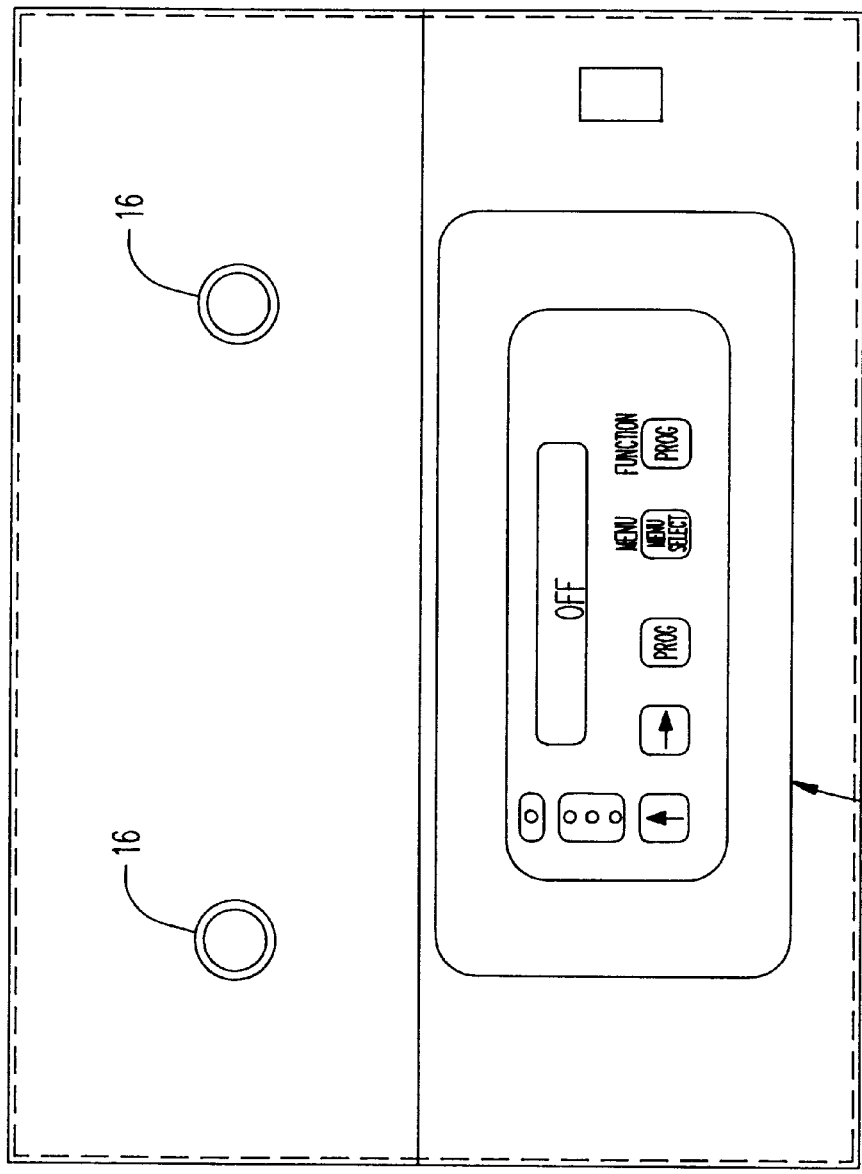
FIG. 4 is a front view of the activation switches and user interface controls of the apparatus of FIG. 1.
Figure 4A:
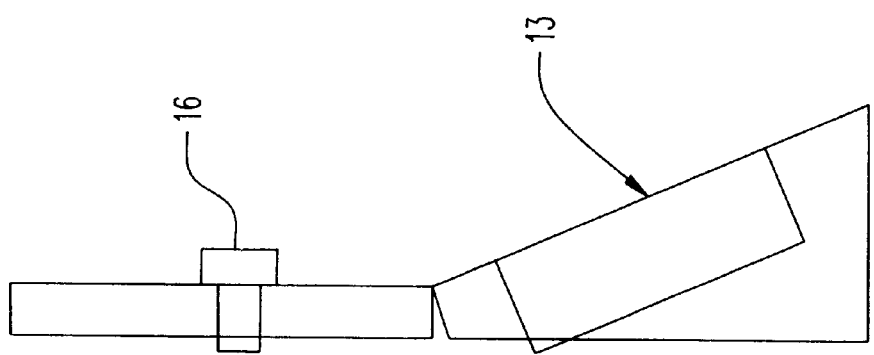
Figure 5:
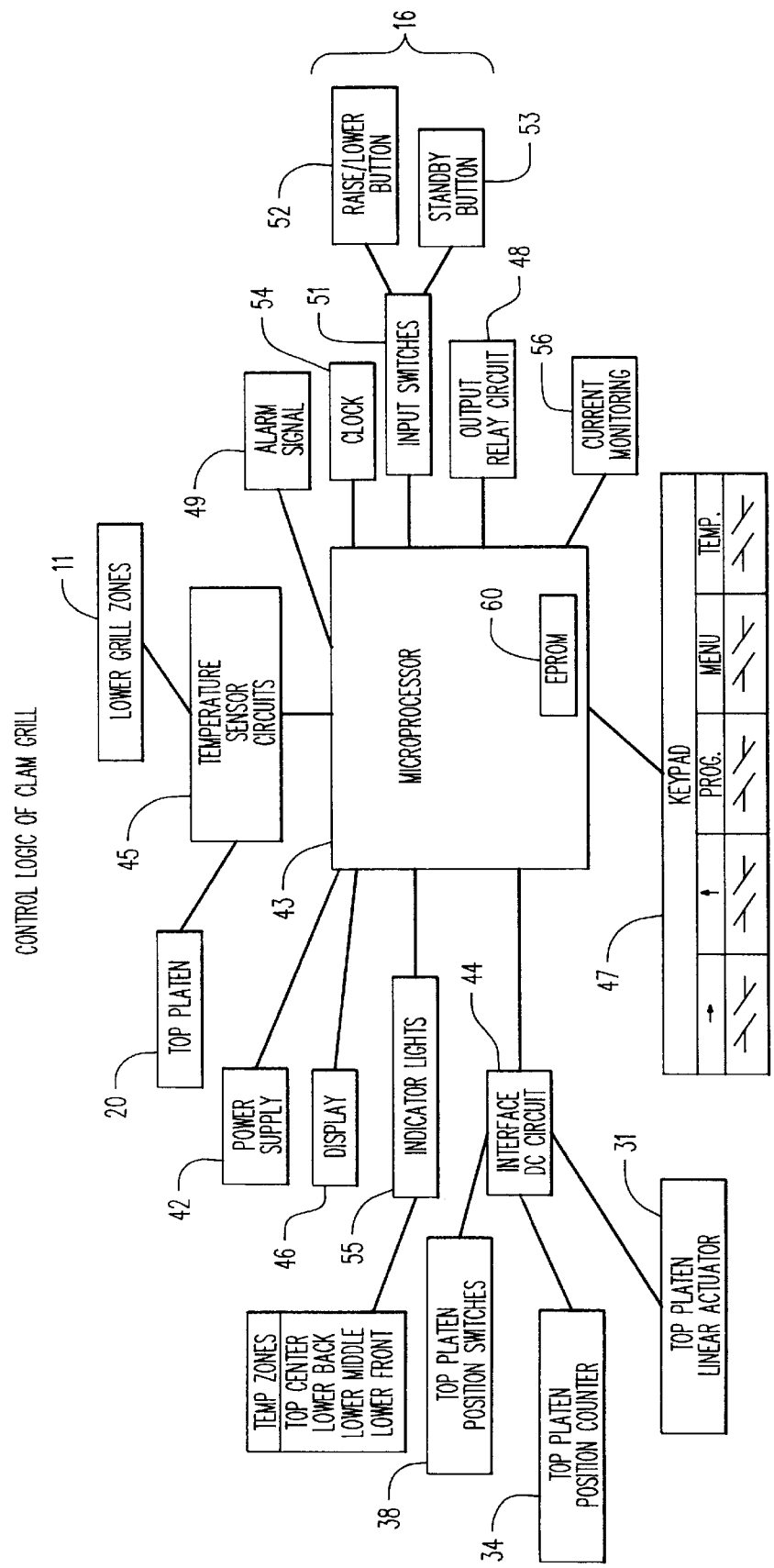
FIG. 5 is a block diagram depicting the control logic of the cooking apparatus according to the present invention.

The computer control is, in this embodiment, mounted behind an access plate contained in a simple user-friendly interface 13 located on the front display of the grill. This interface comprises a control panel including an alpha-numeric digital display panel, operating switches and buttons (42, 52, 53), and LED indicator lights 55 (see FIGS. 4 and 5). The two activation buttons 16 must be pressed simultaneously by the operator to start the movement of upper platen 20 into cooking position. The control panel 13 is sealed behind a polyester cover for protection. Data is accepted by the computing device, typically a microprocessor 43 and additionally, in this embodiment, EPROM 60 pre-programmed with relevant operating or cooking parameters, from control panel 13, temperature circuit 45, position indicators 38, and timer circuitry 54. EPROM 60 is capable of storing a variety of programs, including: menu items, whether individual foods are active or inactive menu items, cooking functions, temperature settings, gap settings, cooking times, and end of cook cycle protocols. EPROM 60 is easily accessible behind its panel on the control board. This allows for easy substitution in the case of a defect or a change in desired programming.

To illustrate, a typical cooking cycle will be outlined. The grill apparatus begins in an inactive state, with its upper platen 20 in its fully open and raised position. The upper platen 20 is at an angle of 54° from horizontal. The operator will select the relevant product setting, e.g., quarter-pound hamburgers, from the menu on control panel 13, then will load the frozen hamburger patties a single layer thick across the surface area of lower platen 11 which will be covered by upper platen 20 when it is lowered. This area may be marked on lower platen 11 for easy reference. When loading is complete, the operator will simultaneously depress the "raise platen" and "standby" buttons (52, 53), which are physically offset from one another, to initiate the cook cycle.

At this point several things occur. The temperature sensing thermocouple probes (not shown) located in the lower and upper platens (11, 20) will be sending data to microprocessor 43 and sensing the temperature of the platens. Microprocessor 43 will activate heating elements 12 in upper and lower platens (11, 20) when appropriate. At the same time, upper platen 20 will begin its two-phase descent into cooking position. Microprocessor 43 will receive data from positioning pulse encoder 34 and lower sensor switch 38 indicating the relative height of vertical reciprocating shafts 33. The positioning pulse encoder 34 will also provide continuous data on the offset distance between the two positioning switch 38 sites. The pulses received by positioning pulse encoder 34 are monitored and must remain constant for upper platen 20 to remain in proper horizontal level. Positioning pulse encoder 34 and lower sensor switch 38 will indicate that upper platen 20 is in its most open, uppermost position. Microprocessor 43 will then activate actuator drive motor 35 which drives linear actuator 31 to begin to lower arm pivot/stop head 24. This motion (combined with the cantilevered weight of upper platen 20) will cause the ends of cantilever bars 22, which are in direct contact with rotational bearings 23, to begin to rotate downward and in a clockwise fashion (when viewed from the side view of FIG. 1) around rotational bearings 32. This, in turn, will cause upper platen 20 to begin to tilt downwards towards horizontal alignment with lower platen 11. In this motion, cantilever bars 22 pivot rotational bearing 32 and the back of cantilever bars 22 roll along the rotational bearing through approximately a 54° arc, and the front edge of upper platen 20 will descend, describing the same 54° arc. The microprocessor will control drive motor 35 throughout this movement so that upper platen 20 is lowered slowly and evenly to minimize any possible safety risks.

The cantilever bars 22 will continue rotating clockwise around rotational bearings 32 until the rear end of the bars engage the stop portion of arm pivot/stop heads 24. This halts the rotational movement of cantilever bars 22 and of upper platen 20. At this point, linear drive motor 35 will continue to lower arm pivot/stop head 24. Because the ends of cantilever bars 22 can no longer rotate due to contact with the stop portion of arm pivot/stop heads 24 there is no more rotation of cantilever bars 22 and upper platen 20 for the remainder of vertical movement imparted by linear drive motor 35 into the system. Thus all motion will now be non-rotational.

The upper platen 20 is now parallel to and suspended above lower platen 11 and hamburger patties. As linear actuator 31, driven by linear drive motor 35, and controlled by motor positioning controller 15, continues to lower arm pivot/stop head 24 and cantilever bars 22, upper platen 20 descends to a predetermined position above lower platen 11. This position was programmed into user interface control 13 for the specific product to be cooked. The positioning pulse encoder 34 will be sending calibrated height data to microprocessor 43. Any inconsistent data will trigger an error or servicing message on display 46, and an audible alarm 49. The height data will pinpoint the height of upper platen 20 above lower platen 11, and above the particular food item to be cooked.

Microprocessor 43 will stop linear drive motor 35 at the exact point set forth in its programming for the beginning of the cook cycle. This height measurement is derived from prior testing data on standardized menu items to provide optimal cooking contact and pressure. The microprocessor is capable of controlling the gap setting to a very precise degree, down to (+/−) 0.0015 inch gradations.

The cooking cycle can be canceled by depressing raise/lower button 16. This allows the operator to change menu selections or other operating parameters.

Microprocessor 43 will sound an audible signal five seconds prior to the conclusion of the cooking timing sequence to alert the operator that the cooking process has been completed and to be ready to begin the process of removing the finished food product. When microprocessor 43 determines that the preset cooking cycle is complete, it automatically restarts the drive motor 35 in the opposite direction causing linear actuator 31 to exert upward force on arm pivot/stop head 24, cantilever bars 22, and upper platen 20. The upward thrust of linear actuator 31 causes arm pivot/stop head 24 and connected upper platen 20 to begin to move upward. The upper platen 20 remains parallel to lower platen 11 and the cooked food products as it lifts away from them. Then, when the ends of cantilever bars 22 again engage rotational bearings 32 the vertical force of linear actuator 31 causes cantilever bars 22 to rotate about rotational pivot bearing 23 in arm pivot/stop head 24 converting the purely vertical motion of upper platen 11 to both vertical and rotational motion, with the ends of bars 22 rotating counterclockwise (as viewed in FIG. 3) about rotational bearings 32 and the front end of upper platen 11 arcing upward until the maximum angle is achieved (approximately 54°). At that point microprocessor 43 halts drive motor 35 and effectively locks upper platen 11 into place.

The uppermost position of upper platen 20 provides clear access to the cooked product for easy removal and for cleaning of the upper and lower platen surfaces. If upper platen 20 moved only horizontally, even in a raised position it would be difficult to see and access food items toward the rear of lower platen 11. If upper platen 20 only rotated about fixed points of attachment on its rear edge, the forward edge of upper platen 20 would potentially remain in a dangerous position. An operator unloading food at the rear of lower platen 11 would run a greater risk of hitting or burning his head on the forward edge. In addition, the rear edge of upper platen 20 would be substantially closer to lower platen 11 reducing the clearance for utensils and hands, increasing the possibility of burn injury from accidental contact with the upper platen cooking surface.

Once again, throughout this two-phase upward motion, microprocessor 43 is receiving and monitoring data inputs from positioning pulse encoder 34 and position sensor switches 38 on vertical reciprocating shafts 33. The offset distance between the two positioning sensor switches 38 must remain constant to keep upper platen 20 in the proper position relative to lower platen 11. The distance traveled by vertical reciprocating shafts 33 tells microprocessor 43 the upper platen's relative location in its traverse. It can be appreciated that the center and rear edge of upper platen 20 also move through the same 54° arc that the front edge travels during the rotational movement. The chords of those arcs are respectively shorter, however, in proportion with their distance from the rotational bearings 32.

For optimal cooking results, microprocessor 43 can be programmed to follow the following steps: precisely apply pressure to the food item to sear the underside of the food; raise the upper platen 20 to release any trapped steam from the food; and precisely lower upper platen 20 again to apply pressure to the food and sear the upper surface of the food. This pressure is then precisely controlled through the remainder of the cooking process. This improved process can create a finished food product having improved appearance and taste, as compared to food produced by a conventional two-sided cooking process.

The upper platen drive system has a safety system built into microprocessor 43 which monitors the amperage of the motor of upper platen 20 when in motion. if microprocessor 43 receives information from linear actuator 35 that is outside the window of acceptable amperage, microprocessor 43 determines that there is some problem causing impairment of motion. If upper platen 20 was descending, microprocessor 43 will stop linear drive motor 35 and output an alarm sound 49 and display an error message on user interface control display 46. If upper platen 20 is in an upward motion when an obstruction is encountered, the microprocessor will reverse the motion of upper platen 20 and move it to a position approximately one inch above lower platen 11 and again output an alarm sound 49 and display an error message on the user interface control display 46. After either of the above events occur, the power to the controls must be reset in order for automatic motion of upper platen 20 to be reinitiated.

The logic diagram (FIG. 5) shows the attributes of user interface control 13. Power to microprocessor 43 is supplied through power switch 42, which, when initiated, will start a check system of microprocessor 43. This diagnostic system check powers D.C. interface 44 and feeds back the cooking surface conditions. Temperature circuit 45 will report temperatures of the upper and lower platens (11, 20) to microprocessor 43, and the results will be available for review at display 46. During this diagnostic check, conditions of circuit 45 are verified and reported to the processor.

Display 46 will show "OFF" once the diagnostic has completed its check. When an operator depresses activation buttons 16, Menu Select position 47 activates microprocessor 43 to a pre-set or programmed condition of cook-time, cooking temperature, and platen position, which will activate output relays 48 as required to achieve the desired temperature. If a problem is detected, alarm signal 49, along with display 46, would indicate the error. The EPROM 60 contains a number of ERROR messages stored in memory. Such error messages include "Probe Open," "Faulty Platen Latch," "Upper Platen Locked," "EPROM Corrupt," "Faulty Element," and "Shortened Probe."

Activation of input switch circuit 51 will initiate a cook cycle. Both raise/lower switch 52 and standby switch 53 require contact closure or depression to start timer clock 54. The system will accept the start only if the menu item or program selected is within the operating temperature range for the predetermined cook cycle. A visual inspection of indicator lights 55 will show heat zone conditions. The "too cool" amber LED indicates heating is in process. The "too hot" red LED is an indication of an excessive temperature condition and the green LED represents the "ready" condition for the selected food product. Display 46 will further describe the griddle's condition with a character message. A flashing message represents a change required to meet the selected program prior to starting the cycle. The steady non-flashing message is the ready condition. Once the program has been initiated, top platen 20 will be lowered by actuator 14. During any of the operations of the grill, current monitoring and/or clutch 56 is available to stop the cycle. When activated, current monitoring 56 will interrupt power supply from D.C. interface 44, shutting off the entire grill and canceling all modes. This will also position upper platen 20 to a neutral location which is midway above lower platen 11, allowing access above and below the grill. By depressing and holding raise/lower switch 52 for three seconds, an operator can cancel a program in progress and raise upper platen 20 to a fully-open position. This cancellation will not turn off microprocessor 43, but will return to the previous menu select position 47.

Microprocessor 43 has a large memory which enables numerous programs to be stored in EPROM 60. The following are conditions that an operator has the ability to preset:

Menu Item: Alpha-numeric character display describing the menu item.

Operate Mode: A choice of an active or a non-active menu item. The cooking conditions are stored in memory when in a non-active mode.

Function (Duty): Alpha character display of a prompt such as Turn, Remove, etc.

Temperatures: Setting of temperature for upper and lower platens (11, 20).

Gap Setting: Numeric setting (in thousandths of an inch) of position between upper and lower platens (11, 20).

Time: Numeric value (in seconds) for duration of platen down, at gap setting.

Cancellation Method: Selection of how the upper platen will operate at end of timing and how the audible signal will cancel.

Microprocessor 43 uses EPROM 60 which enables a chip to be factory programmed with menu items predetermined and loaded into the controller's operating memory quickly. Exchange of EPROM 60 will allow for complete menu changes reducing the on-side programming required. Each EPROM's programs can be altered through a program access to re-program the menu items. A key programmable item which offers market advantage is the precise gap setting to (+/−) 0.0015 inches.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A clam shell grill comprising:
   a support structure;
   a lower cooking platen having a lower cooking surface and being mounted to said support structure;
   an upper cooking platen having an upper cooking surface and being mounted to said support structure for movement between a cooking position and a non-cooking position, said upper cooking surface being substantially parallel to said lower cooking surface when said upper cooking platen is in said cooking position;
   a motor for effecting said movement;
   means for monitoring said movement, said means for monitoring being capable of generating a signal indicative of the current position of said upper platen during said movement; and
   control means responsive to said signal for operating said motor to accurately position said upper platen to said cooking position.

2. The clam shell grill of claim 1, wherein said upper cooking surface is substantially parallel to said lower cooking surface when said upper cooking platen is in said non-cooking position.

3. The clam shell grill of claim 2, wherein a linear actuator is mounted to said structure and said motor effects said movement through said linear actuator.

4. The clam shell grill of claim 3, wherein said linear actuator includes two reciprocating guide shafts arranged to keep said upper cooking surface of said upper cooking platen substantially parallel to said lower cooking surface.

5. The clam shell grill of claim 4, wherein said means for monitoring includes positioning switches on sid two reciprocating shafts and a positioning encoder for receiving data from said positioning switches indicative of said current position, said data being used generating said control signal.

* * * * *